US012564950B2

(12) United States Patent
Karito

(10) Patent No.: US 12,564,950 B2
(45) Date of Patent: Mar. 3, 2026

(54) ROBOT CONTROL METHOD, ROBOT CONTROL SYSTEM, AND ROBOT CONTROL PROGRAM

(71) Applicant: SEIKO EPSON CORPORATION, Tokyo (JP)

(72) Inventor: Nobuhiro Karito, Kiso (JP)

(73) Assignee: SEIKO EPSON CORPORATION (JP)

( * ) Notice: Subject to any disclaimer, the term of this patent is extended or adjusted under 35 U.S.C. 154(b) by 452 days.

(21) Appl. No.: 17/969,718

(22) Filed: Oct. 20, 2022

(65) Prior Publication Data

US 2023/0128011 A1 Apr. 27, 2023

(30) Foreign Application Priority Data

Oct. 21, 2021 (JP) ................................ 2021-172265

(51) Int. Cl.
*B25J 9/16* (2006.01)
*B25J 9/00* (2006.01)

(52) U.S. Cl.
CPC ........... *B25J 9/1661* (2013.01); *B25J 9/0084* (2013.01)

(58) Field of Classification Search
CPC ....... B25J 9/1661; B25J 9/0084; B25J 9/1656
See application file for complete search history.

(56) References Cited

U.S. PATENT DOCUMENTS

| | | | | |
|---|---|---|---|---|
| 5,361,367 A | * | 11/1994 | Fijany ................. | G06F 15/8015 |
| | | | | 712/15 |
| 2010/0231962 A1 | * | 9/2010 | Sakai ..................... | G03G 15/50 |
| | | | | 358/1.15 |
| 2010/0272454 A1 | * | 10/2010 | Seki ................... | H04N 1/00952 |
| | | | | 399/38 |
| 2018/0071806 A1 | * | 3/2018 | Song ................... | C21D 9/0018 |
| 2018/0229367 A1 | | 8/2018 | Lee et al. | |
| 2022/0331951 A1 | * | 10/2022 | Karito ................... | B25J 9/1628 |

FOREIGN PATENT DOCUMENTS

| | | | |
|---|---|---|---|
| JP | 2006171906 A | * | 6/2006 |
| JP | 2018-535468 A | | 11/2018 |
| WO | 2017-052061 A1 | | 3/2017 |

* cited by examiner

*Primary Examiner* — Jay Khandpur
(74) *Attorney, Agent, or Firm* — Harness, Dickey & Pierce, P.L.C.

(57) ABSTRACT

In a robot system including robots, lower-level control units respectively coupled to the robots and controlling one of the robots, and an upper-level control unit coupled to the lower-level control units and transmitting command information for control of the robots to the lower-level control units, a method of controlling the robots executed by the upper-level control unit is provided. The upper-level control unit includes a processor having a plurality of processor cores. Part of the processor cores of the plurality of processor cores are isolated from the other processor cores. Communication tasks with the lower-level control units are assigned to the isolated part of the processor cores. The isolated part of the processor cores are controlled to execute the communication tasks with the lower-level control units and the command information is transmitted to the lower-level control units. The isolation of the isolated part of the processor cores is released.

8 Claims, 8 Drawing Sheets

Figure 3:
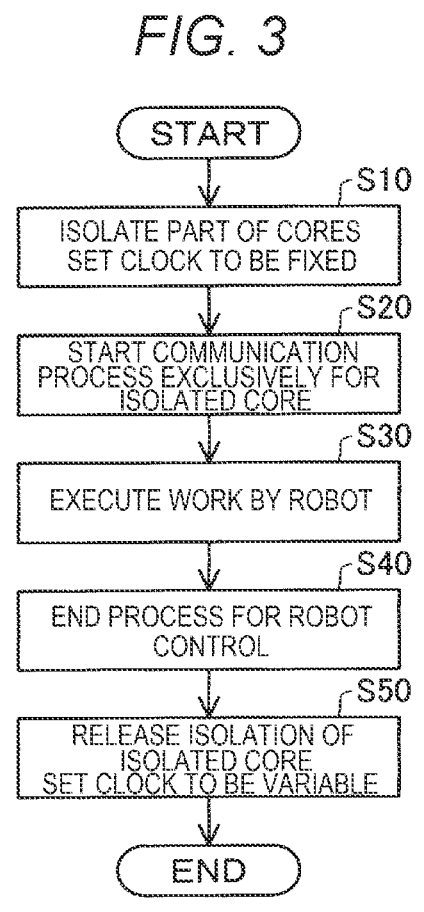

START

S10

ISOLATE PART OF CORES
SET CLOCK TO BE FIXED

S20

START COMMUNICATION
PROCESS EXCLUSIVELY FOR
ISOLATED CORE

S30

EXECUTE WORK BY ROBOT

S40

END PROCESS FOR ROBOT
CONTROL

S50

RELEASE ISOLATION OF
ISOLATED CORE
SET CLOCK TO BE VARIABLE

END

ROBOT CONTROL METHOD, ROBOT CONTROL SYSTEM, AND ROBOT CONTROL PROGRAM

The present application is based on, and claims priority from JP Application Serial Number 2021-172265, filed Oct. 21, 2021, the disclosure of which is hereby incorporated by reference herein in its entirety.

BACKGROUND

1. Technical Field

The present disclosure relates to a robot control system, a robot control method, and a robot control program.

2. Related Art

In related art, as disclosed in JP-T-2018-535468, there is a technique of realizing robot control in real time by a predetermined operation period using a real-time operating system realized on a general-purpose operating system. In the technique disclosed in JP-T-2018-535468, a real-time operating system environment is constructed on the general-purpose operating system.

However, operation of other application software operating on the general-purpose operating system may be unstable. Further, when a new real-time operating system is introduced onto a general-purpose operating system of a system possessed by a user in advance, the real-time operating system and an application program operating on the real-time operating system may not appropriately operate depending on the configuration of the system possessed by the user. Furthermore, it is necessary to prepare another communication board controlled by the real-time operating system to make real-time communication than the communication board provided in the system of the user and controlled by the general-purpose operating system.

SUMMARY

According to a first aspect of the present disclosure, a method, in a robot system including one or more robots, one or more lower-level control units respectively coupled to the one or more robots and respectively controlling one of the one or more robots, and an upper-level control unit coupled to the one or more lower-level control units and transmitting command information for control of the one or more robots to the one or more lower-level control units, of controlling the one or more robots executed by the upper-level control unit is provided. The upper-level control unit includes a processor having a plurality of processor cores. The method includes an isolation step of isolating part of the processor cores of the plurality of processor cores from the other processor cores of the plurality of processor cores, an assignment step of assigning one or more communication tasks with the one or more lower-level control units to the isolated part of the processor cores, a communication step of transmitting the command information to the one or more lower-level control units by controlling the isolated part of the processor cores to execute the one or more communication tasks with the one or more lower-level control units, and a release step of releasing the isolation of the isolated part of the processor cores.

BRIEF DESCRIPTION OF THE DRAWINGS

FIG. 1 is an explanatory diagram showing an example of a robot control system in one embodiment.

FIG. 3 is a flowchart showing processing when an upper-level control apparatus performs control of a robot.

DESCRIPTION OF EXEMPLARY EMBODIMENTS

A. First Embodiment

Figure 1:
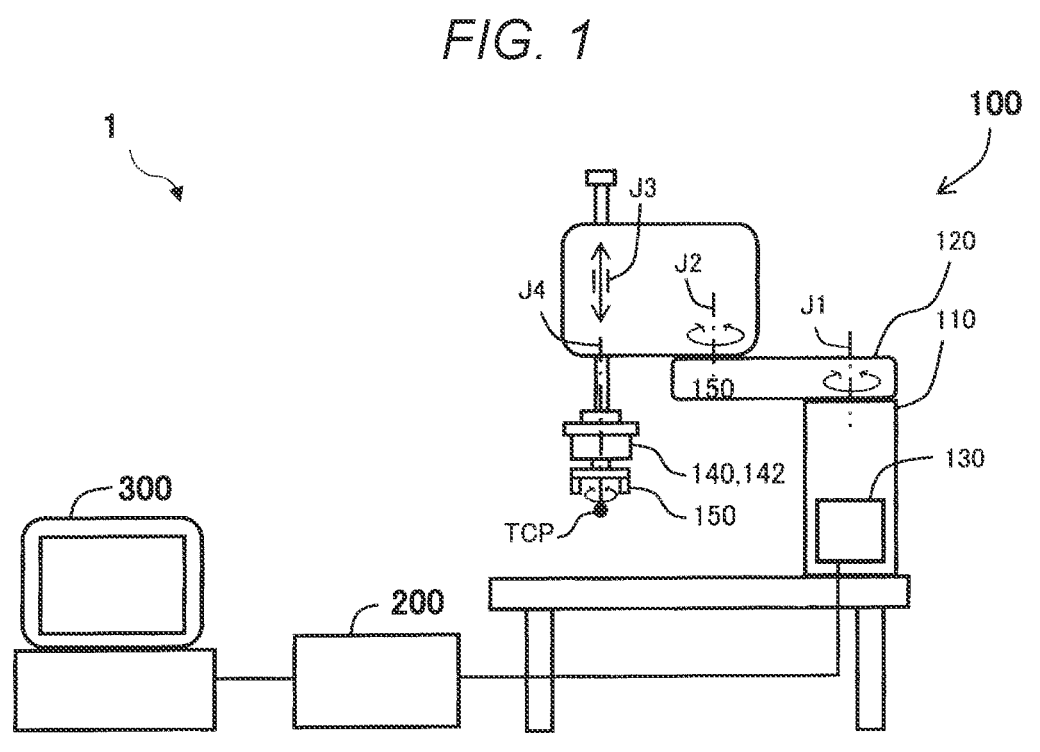
Figure 2:
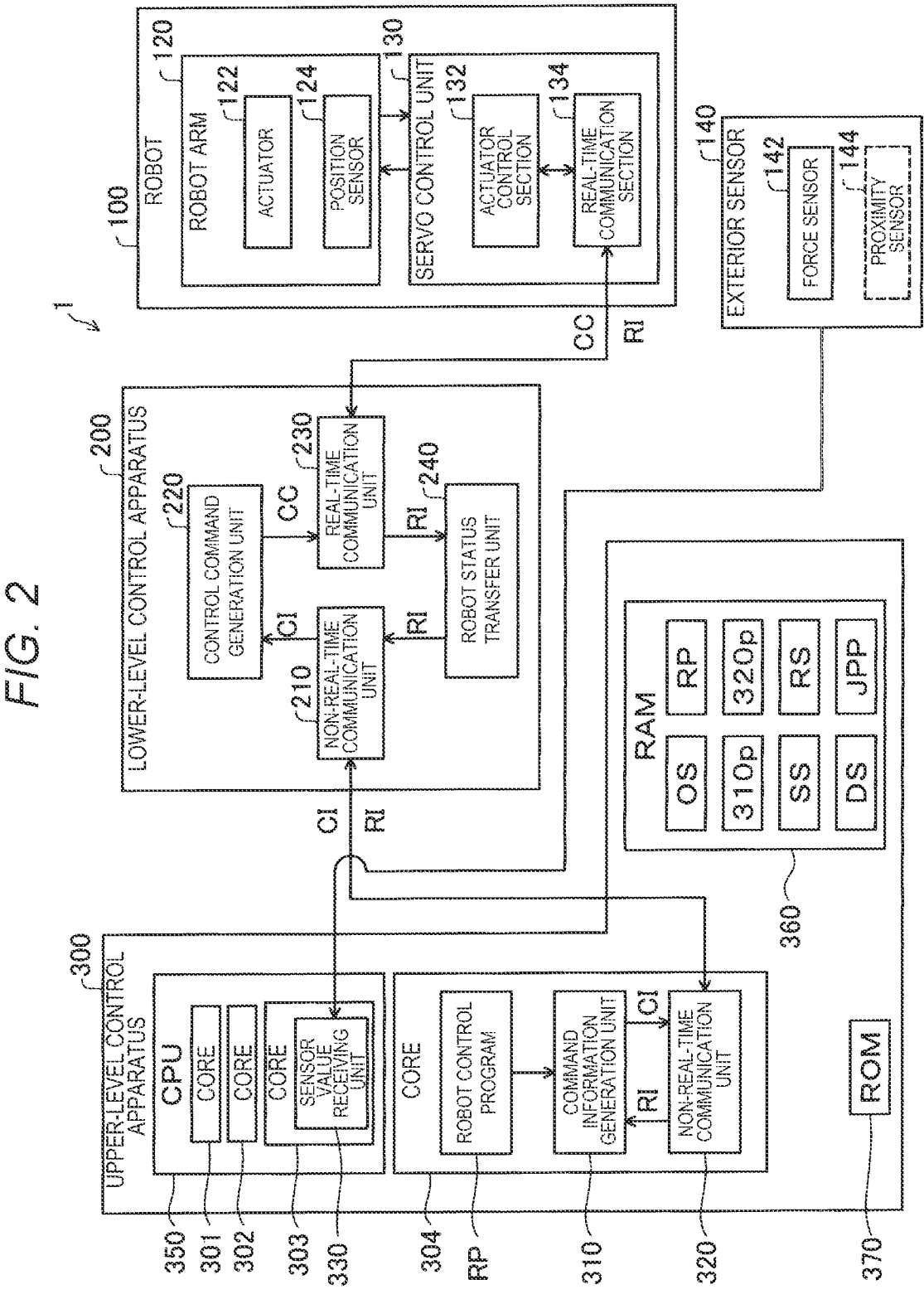
FIG. 2 is a functional block diagram of the robot control system.

FIG. 1 is an explanatory diagram showing an example of a robot control system 1 in one embodiment. The robot control system 1 includes a robot 100, an exterior sensor 140 sensing a status of the robot 100, an end effector 150 handling an object of work, a lower-level control apparatus 200 transmitting a control command CC to the robot 100, and an upper-level control apparatus 300 transmitting command information CI for creation of the control command CC to the lower-level control apparatus 200. The lower-level control apparatus 200 is e.g. a robot controller and the upper-level control apparatus 300 is e.g. a computer loaded with Linux (registered trademark) as an operating system. Linux is not a real-time operating system, but a general-purpose operating system.

The robot 100 includes a base 110, a robot arm 120, and a servo control unit 130. The servo control unit 130 executes servo control on actuators moving joints of the robot arm 120. The servo control unit 130 is coupled to the lower-level control apparatus 200. The servo control unit 130 is also referred to as "servo board".

The robot arm 120 is sequentially coupled by four joints J1 to J4. A force sensor 142 as the exterior sensor 140 and the end effector 150 are attached to the distal end portion of the robot arm 120. The force sensor 142 may be omitted. Further, another sensor including a proximity sensor, a gyro sensor, and a vibration sensor may be provided in the robot arm 120. A TCP (Tool Center Point) as a control point for the robot 100 is set near the distal end of the robot arm 120. In the embodiment, a four-axis robot having the four joints J1 to J4 is exemplified, however, a robot including any arm mechanism having a plurality of joints can be used. The robot 100 of the embodiment is a horizontal articulated robot, however, a vertical articulated robot may be used.

FIG. 2 is a functional block diagram of the robot control system 1. The lower-level control apparatus 200 is coupled to the robot 100 and controls the robot 100. Specifically, the lower-level control apparatus 200 transmits the control command CC to the servo control unit 130 and controls the robot 100 in synchronization with a predetermined control period of the robot. Further, the lower-level control apparatus 200 receives robot status information RI from the servo control unit 130 and transmits the information to the upper-level control apparatus 300 in synchronization with the control period of the robot.

The upper-level control apparatus 300 is coupled to the lower-level control apparatus 200. The upper-level control apparatus 300 transmits the command information CI for control of the robot 100 to the lower-level control apparatus 200. Specifically, the upper-level control apparatus 300 creates the next command information CI using the robot status information RI as necessary. The upper-level control apparatus 300 transmits the command information CI to the lower-level control apparatus 200 within a predetermined transmission time shorter than the control period of the robot from the time when receiving the robot status information RI.

The robot arm 120 includes actuators 122 and position sensors 124 (see the upper right part in FIG. 2). The actuators 122 are provided in the individual joints and used for moving the individual joints.

The position sensors 124 sense the positions of the respective joints of the robot arm 120. In the present disclosure, the position of the joint refers to a displacement or an angle of the joint. The robot status information RI received from the servo control unit 130 by the lower-level control apparatus 200 is information representing the status of the robot 100. The robot status information RI contains position data as detection values of the position sensors 124 in the plurality of joints and error information of the robot 100. The position sensors 124 are specifically encoders. The actuators 122 specifically include the encoders as the position sensors 124.

The servo control unit 130 has an actuator control section 132 executing control of the actuators 122 and a real-time communication section 134 (see the middle right part in FIG. 2).

The real-time communication section 134 has a function of making synchronous communications with the lower-level control apparatus 200 with the control period of the robot. In the embodiment, the control period of the robot is 2 ms. The servo control unit 130 and the lower-level control apparatus 200 are connected by a protocol that can make real-time communications with a constant period e.g. EtherCAT (registered trademark) (Ethernet Control Automation Technology). In EtherCAT, digital data, analog data, and process data in which input and output information including the encoder values is connected may be exchanged on Ethernet frames. In the EtherCAT connection, the lower-level control apparatus 200 functions as a master and the servo control unit 130 functions as a slave.

The exterior sensor 140 is a sensor sensing the status of the robot 100. The exterior sensor 140 transmits detection values with a constant period e.g. 2 ms to the upper-level control apparatus 300 not via the servo control unit 130. The exterior sensor 140 includes the force sensor 142. The force sensor 142 may sense a direction and magnitude of a force applied from outside. The force sensor 142 transmits the detection values with the period 2 ms to the upper-level control apparatus 300.

The upper-level control apparatus 300 has a command information generation unit 310, a non-real-time communication unit 320, and a sensor value receiving unit 330 (see the left part in FIG. 2). The command information generation unit 310 generates a trajectory of the robot arm 120 according to a robot control program RP created in advance, and creates the command information CI for moving the robot arm 120 according to the trajectory. The command information CI contains a position command for moving the robot arm 120. The position command is a command indicating the positions or displacements of the plurality of actuators of the robot arm 120 and indicates a position in 2-ms period as the control period of the robot.

The non-real-time communication unit 320 executes non-real-time communication with a non-real-time communication unit 210 of the lower-level control apparatus 200. In the embodiment, the upper-level control apparatus 300 and the lower-level control apparatus 200 are connected by Ethernet. In the non-real-time communication, in DDS (Data Distribution Service), the command information CI is transmitted from the upper-level control apparatus 300 to the lower-level control apparatus 200 and the robot status information RI is transmitted from the lower-level control apparatus 200 to the upper-level control apparatus 300. The robot status information RI received by the non-real-time communication unit 320 is transferred to the command information generation unit 310 and used for creation of the command information CI. As described above, the robot status information RI contains the position data of the respective joints of the robot arm 120.

The sensor value receiving unit 330 executes non-real-time communication with the exterior sensor 140. In the embodiment, the upper-level control apparatus 300 and the exterior sensor 140 are coupled by Ethernet. The exterior sensor 140 and the upper-level control apparatus 300 may be coupled by USB (Universal Serial Bus). The detection values of the exterior sensor 140 received by the sensor value receiving unit 330 are transferred to the command information generation unit 310 and used for the creation of the command information CI.

The command information generation unit 310 executes processing of creating the command information CI according to the robot control program RP. As the processing on the command information CI, one of the following pieces of processing can be selected and executed:

(i) First processing of creating the command information CI according to the robot control program RP without using the robot status information RI received from the lower-level control apparatus 200; and (ii) Second processing of creating the command information CI using the robot status information RI according to the robot control program RP.

Which of these two pieces of processing is selected and executed is described in the robot control program RP in advance. In this manner, the command information generation unit 310 creates the command information CI using the robot status information RI as necessary. Accordingly, the lower-level control apparatus 200 may move the robot 100 by transmitting the control command CC on which the robot status information RI is reflected to the servo control unit 130. Note that the second processing may be constantly executed instead of selectively executing the above described two pieces of processing.

Examples of creation of the command information CI using the robot status information RI in the second processing are as follows:

(1) changing a parameter of force control contained in the command information CI using the sensor value of the force sensor 142;

(2) creating the command information CI in which an amount of displacement by force control is added to displacement by position control using the sensor value of the force sensor 142; and (3) creating the command information CI to start acceleration or deceleration of the control point when the encoder value of a specific joint reaches a value indicating a specific angle.

The upper-level control apparatus 300 includes a CPU 350 as a processor, a RAM 360, and a ROM 370 as a specific configuration. The RAM 360 includes a main memory as a semiconductor memory and an auxiliary storage device as a hard disk. In the hard disk, (i) an operating system OS, (ii) the robot control program RP, (iii) a program 310$p$ for the CPU 350 to function as the command information generation unit 310, (iv) a program 320$p$ for the CPU 350 to function as the non-real-time communication unit 320, (v) an isolation script SS, an assignment script DS, and a release script RS, which will be described later, (vi) a work plan creation program JPP for planning of work including work by the robot and other work, etc. are stored. The CPU 350 realizes real-time control of the robot 100 on the Linux as the operating system OS by loading and executing a computer program stored in the hard disk in the main memory.

The CPU 350 includes four processor cores 301 to 304. In this specification, "processor core" refers to an arithmetic unit that independently functions inside of the CPU. The CPU 350 may execute a plurality of tasks on the Linux as a multitask operating system using one or more processor cores of the four processor cores 301 to 304. The plurality of tasks contain a communication process with the lower-level control apparatus 200 realized by the non-real-time communication unit 320. The plurality of tasks contain a process realized by the command information generation unit 310 and a process executing the work plan creation program JPP.

The functions of the command information generation unit 310 and the non-real-time communication unit 320 are realized by the processor core 304. The function of the sensor value receiving unit 330 is realized by the processor core 303. In the control of the robot 100, the processor core 304 is isolated from the other processor cores 301 to 303. The isolation processing of the processor core 304 will be described later.

The lower-level control apparatus 200 has the non-real-time communication unit 210, a control command generation unit 220, a real-time communication unit 230, and a robot status transfer unit 240 (see the middle part in FIG. 2). The command information CI transmitted from the upper-level control apparatus 300 is received by the non-real-time communication unit 210 and transferred to the control command generation unit 220. The control command generation unit 220 creates the control command CC according to the command information CI. The control command CC contains substantially the same position command as the position command with 2-ms period contained in the command information CI. The control command CC may be the same as the command information CI. The real-time communication unit 230 transmits the control command CC to the servo control unit 130 and receives the robot status information RI from the servo control unit 130 with respect to each control period of the robot. The robot status information RI is transmitted from the robot status transfer unit 240 via the non-real-time communication unit 210 to the upper-level control apparatus 300.

Note that, when the communication between the upper-level control apparatus 300 and the lower-level control apparatus 200 is normal, the control command CC created in the control command generation unit 220 contains the same position command as that of the command information CI received from the upper-level control apparatus 300. On the other hand, when the communication between the control apparatuses is delayed, the control command generation unit 220 creates the next control command CC without waiting for the reception of the command information CI from the upper-level control apparatus 300. This processing will be further described in later.

FIG. 3 is a flowchart showing processing when an upper-level control apparatus 300 performs control of the robot 100. The processing in FIG. 3 is executed in the CPU 350 of the upper-level control apparatus 300.

At step S10, the isolation processing of isolating the processor core 304 of the processor cores 301 to 304 from the other processor cores 301 to 303 is executed. For example, the isolation processing is performed by execution of a script containing the following description on the Linux. Note that, in the specification, "script" refers to a program for one or more predetermined pieces of processing.

cset shield --cpu 3

Numbers 0, 1, 2, 3 are assigned to the processor cores 301 to 304, respectively. "cset shield" is a command to isolate the processor core. "--cpu 3" is a parameter for designation of the processor core 304 with the number 3 assigned thereto.

The processor core 304 of the processor cores 301 to 304 is isolated from the other processor cores 301 to 303 of the processor cores 301 to 304 by the script containing the above description. As a result, the other processes than the processes of the command information generation unit 310 and the non-real-time communication unit 320 are executed by the other processor cores than the processor core 304. The script fulfilling the function is also referred to as "isolation script SS".

Further, at step S10, processing of fixing the operation clock of the isolated processor core 304 is executed. For example, the processing is performed by execution of a script containing the following description on the Linux.

cpufreq-set --cpu 3 -g performance

"cpufreq-set" is a command to change the operation frequency of the operation clock of one processor core. "--cpu 3" is a parameter for designation of the processor core 304 with the number 3 assigned thereto. "-g performance" is a parameter for designation of setting of the operation frequency of the operation clock of the processor core to the maximum value.

In the processor core having the variable operation clock, the operation clock becomes lower when the load is lower. Then, when it is necessary to execute some processing with a larger load, the operation clock is increased. In the processor core, transition from the lower operation clock to the higher operation clock takes time. Accordingly, when the processor core having the dynamically variable operation clock is controlled to execute the communication process with the lower-level control apparatus 200, the execution of the communication process with the lower-level control apparatus 200 may be late for the necessary timing. However, the above described processing is performed and the operation clock of the isolated processor core 304 is fixed, and thereby, the delay may be prevented.

Regarding the other processor cores 301 to 303, the operation clocks are set to be variable. Accordingly, in the other processor cores 301 to 303, when the processing load is lower, the operation clock may be lowered and the power consumption may be reduced. Or, when the processing load is higher, the operation clock may be increased and the processing time may be shortened.

At step S20, the assignment processing of assigning the communication process with the lower-level control apparatus 200 to the isolated processor core 304 is executed. The assignment processing is performed by execution of a script containing the following description on the Linux.

cset shield --exec program name arg1 arg2

"cset shield --exec" is a command to assign a program to the isolated processor core. "program name" is a parameter for designation of the name of the program to be assigned. "arg1" and "arg2" are parameters designated when the program to be assigned is executed. The communication process with the lower-level control apparatus 200 is started exclusively for the processor core 304 by the script containing the above description. As a result, the processes of the command information generation unit 310 and the non-real-time communication unit 320 controlling the robot 100 are executed by the processor core 304 only. The script fulfilling the function is also referred to as "assignment script DS".

At step S30, work by the robot 100 is executed. The processor core 304 of the upper-level control apparatus 300 executes the process for controlling the robot 100 according to the robot control program RP. More specifically, the upper-level control apparatus 300 controls the isolated processor core 304 to execute the communication process with the lower-level control apparatus 200, and thereby, executes the communication processing of transmitting the command information CI to the lower-level control apparatus 200. As a result, the command information CI is repeatedly transmitted from the non-real-time communication unit 320 to the lower-level control apparatus 200.

At step S40, the work by the robot 100 ends. The processor core 304 of the upper-level control apparatus 300 ends the process for controlling the robot 100.

At step S50, the release processing of releasing isolation of the isolated processor core 304 is executed. The release processing is performed by execution of a script containing the following description on the Linux.

cset shield --reset

The isolation of the isolated processor core 304 is released by the script containing the above description. The script fulfilling the function is also referred to as "release script".

Further, at step S50, processing of setting the operation clock of the isolated processor core 304 to be variable is executed.

In a case where the processing at S10, S20 in FIG. 3 is not performed, when the load of the other processing executed in the CPU 350 than the control of the robot increases, the transmission of the command information CI by the command information generation unit 310 and the non-real-time communication unit 320 may be late for the control period of the robot 100 and the end effector 150 may push the object of the work with an excessive force.

However, in the embodiment, the isolation processing and the assignment processing are performed, and thereby, the processor core 304 may be controlled to stably execute the communication process with the lower-level control apparatus 200 without being affected by the load of the processing of the work plan creation program JPP etc. executed by the other processor cores 301 to 303 (see S10 in FIG. 3 and the middle left part in FIG. 2). Accordingly, it is highly possible that the command information CI may be transmitted to the lower-level control apparatus 200 by the upper-level control apparatus 300 not introducing the real-time operating system without a delay for the timing determined by the control period of the robot 100 in the lower-level control apparatus 200. As a result, the control of the robot 100 may be performed not using a high-end computer, but using a middle-range computer.

Further, in the embodiment, after the control of the robot 100 ends, the isolation of the processor core 304 to which the communication process is assigned is released (see S50 in FIG. 3). As a result, then, the CPU 350 may perform processing using all of the processor cores 301 to 304 for given processing. That is, then, throughput of the upper-level control apparatus 300 when other various kinds of processing than the control of robot 100 is executed by the upper-level control apparatus 300 may be increased.

Furthermore, the operation clock of the processor core 304 is set to be variable (see S50 in FIG. 3), and thereby, throughput of all processor cores 301 to 304 may be changed according to loads to be processed.

Figure 4:
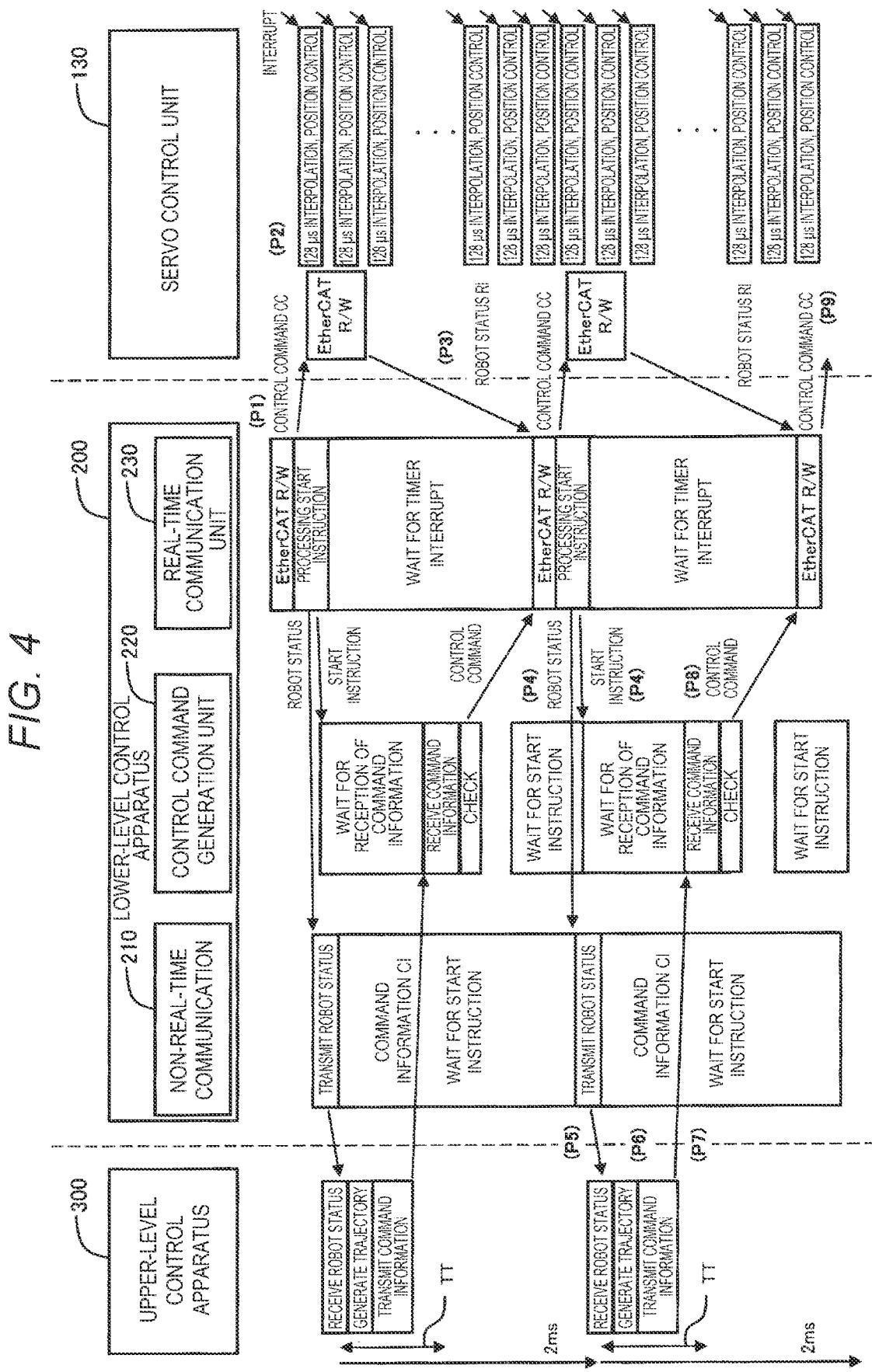
FIG. 4 is a sequence diagram of control of the robot when communication between control apparatuses is normal.

FIG. 4 is a sequence diagram of the control of the robot 100 when the communication between the control apparatuses is normal. In the following description, various kinds of processing will be explained in the order of the processing P1 to P10 shown in FIG. 4. In FIG. 4, for convenience of illustration, the robot status transfer unit 240 is not shown, and "robot status information" is simply described as "robot status".

The lower-level control apparatus 200 operates with a constant control period using timer interrupt of the lower-level control apparatus 200. As described above, the control period is 2 ms. Specifically, the real-time communication unit 230 of the lower-level control apparatus 200 executes read/write, i.e., transmission and reception by the EtherCAT protocol in response to the timer interrupt with respect to each control period of 2 ms. The times of transmission and reception by the real-time communication unit 230 are reference times for control of the operation times of the other respective units.

In the processing P1, the real-time communication unit 230 transmits the control command CC to the servo control unit 130 at the time of timer interrupt (see the upper right part in FIG. 4). The control command CC contains the position command for 2-ms period with respect to each joint of the robot arm 120. In the processing P2, the servo control unit 130 controls the actuators 122 of the robot arm 120 by interpolating the received position command for 2-ms period in a plurality of position commands for more shorter divisional control periods (see the upper right part in FIG. 4). In the example of FIG. 4, the divisional control period is a 128-μs period.

In the processing P3, the servo control unit 130 transmits the robot status information RI to the lower-level control apparatus 200 (see the middle right part in FIG. 4). As described above, the robot status information RI contains the position data of the respective joints. The real-time communication unit 230 of the lower-level control apparatus 200 transmits the control command CC to the servo control unit 130, and then, in the processing P4, respectively instructs the control command generation unit 220 and the robot status transfer unit 240 to start the operation (see the center part in FIG. 4). As described above, the robot status transfer unit 240 is not shown in FIG. 4. Note that both the control command generation unit 220 and the robot status transfer unit 240 execute tasks in real time and, when receiving start instructions, start operation with small jitter less than several tens of microseconds. Note that "jitter" refers to a difference of the interval between the previous start time and the present start time from an expected value, 2 ms. In the processing P5, the robot status transfer unit 240 transfers the robot status information RI received from the servo control unit 130 via the non-real-time communication unit 210 to the upper-level control apparatus 300 (see the lower left part in FIG. 4).

In the processing P6, the command information generation unit 310 of the upper-level control apparatus 300 confirms the reception of the robot status information RI, executes calculation of a trajectory for the next position command, and generates command information CI containing the position command (see the lower left part in FIG. 4). When the generation of the command information CI ends, in the processing P7, the upper-level control apparatus 300 promptly transmits the command information CI containing the position command to the lower-level control apparatus 200 (see the lower left part in FIG. 4). A unique serial sequence number is assigned to the command information CI. When the processing within the upper-level control apparatus 300 and the communication between the control apparatuses are normally executed, the transmission of the command information CI is executed within a predetermined transmission time TT shorter than 2 ms as the control period of the robot from the time when the robot status information RI is received (see the lower left part in FIG. 4).

The upper-level control apparatus 300 operates with Linux, not a real-time OS. Accordingly, it is impossible to transmit the next command information CI in less than several tens of microseconds after the robot status information RI is received from the lower-level control apparatus 200. However, if the command information CI can be transmitted within the transmission time TT from the time when the robot status information RI is received, the upper-level control apparatus 300 may transmit the next command information CI in time for the time when the lower-level control apparatus 200 transmits the next control command CC to the servo control unit 130.

The control command generation unit 220 of the lower-level control apparatus 200 waits for transmission of the command information CI from the upper-level control apparatus 300 after an instruction on the operation start is given from the real-time communication unit 230. In the processing P8, when receiving the command information CI from the upper-level control apparatus 300, the control command generation unit 220 checks the sequence number attached to the command information CI and checks whether or not the position, the velocity, the acceleration indicated by the position command exceed limits (see the lower center part in FIG. 4). When the command information CI does not have an abnormality, in the processing P9, the control command generation unit 220 creates the control command CC containing the position command and transmits the command via the real-time communication unit 230 to the servo control unit 130 (see the lower right part in FIG. 4).

As described above, the lower-level control apparatus 200 transmits the robot status information RI in synchronization with a predetermined control period to the upper-level control apparatus 300, and the upper-level control apparatus 300 transmits the command information CI within the predetermined transmission time TT shorter than the control period from the time when receiving the robot status information RI from the lower-level control apparatus 200. In the robot control system 1, the communication between the upper-level control apparatus 300 and the lower-level control apparatus 200 is performed within the transmission time TT shorter than the control period of the robot, and accordingly, the lower-level control apparatus 200 may transmit the control command CC to the servo control unit 130 with respect to each control period and execute a robot motion requiring responsiveness without any trouble. Note that, when the communication from the upper-level control apparatus 300 to the lower-level control apparatus 200 is largely delayed, the processing is executed in the following manner.

Figure 5:
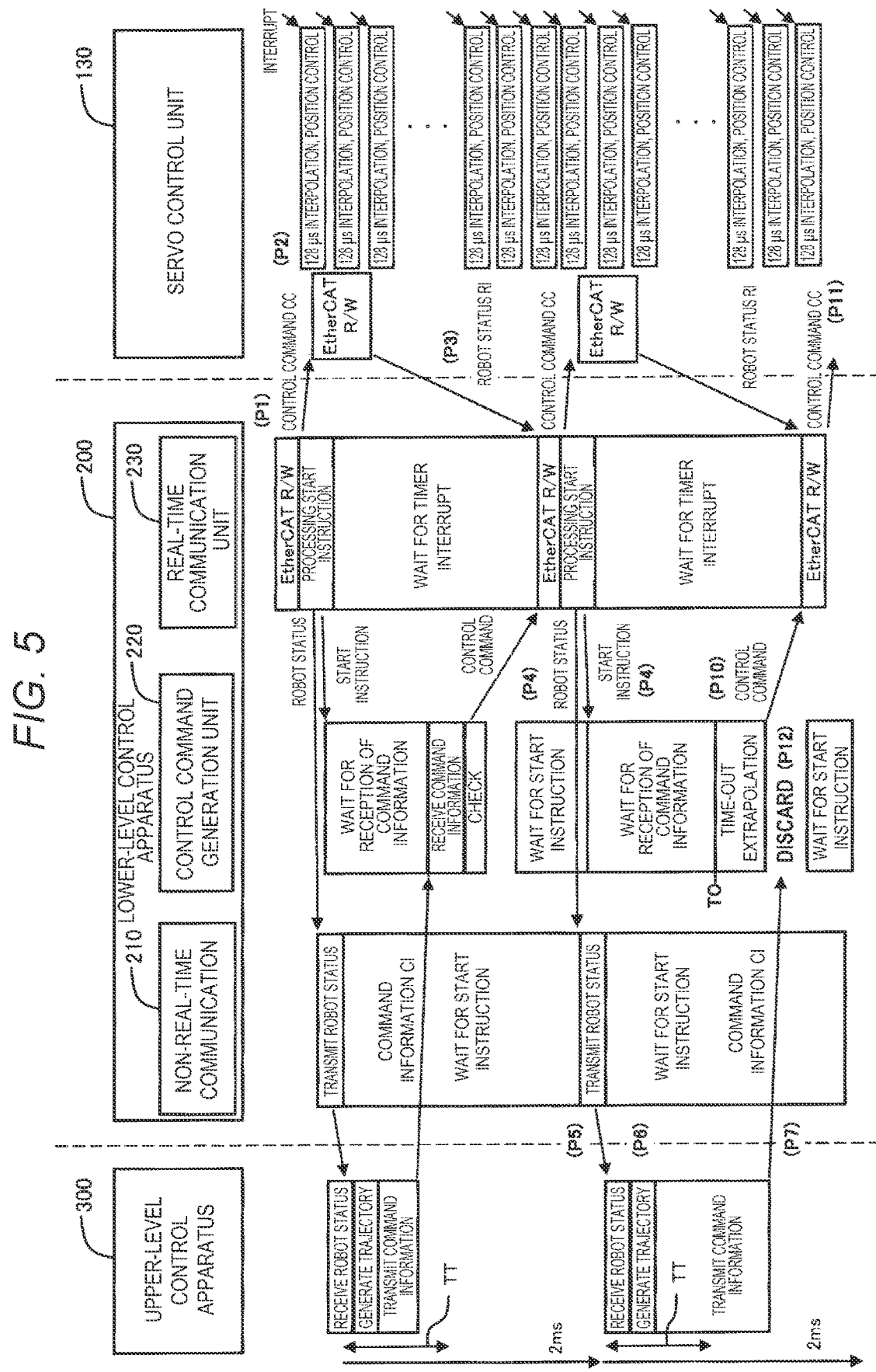
FIG. 5 is a sequence diagram of control of the robot when time-out occurs in the communication between the control apparatuses.

FIG. 5 is a sequence diagram of the control of the robot 100 when time-out occurs in the communication between the control apparatuses. The processing P1 to P7 is the same as that in FIG. 4. In FIG. 5, a case where the command information CI transmitted from the upper-level control apparatus 300 to the lower-level control apparatus 200 in the processing P7 is late for the control period of the robot 100, that is, late for the time when the next control command CC is transmitted from the lower-level control apparatus 200 to the servo control unit 130 is assumed. Specifically, the transmission of the command information CI in the processing P7 in FIG. 5 occurs after a lapse of the normal transmission time TT (see the lower left part in FIG. 5). In this case, in the processing P10, the processing of waiting for the reception of the command information CI from the upper-level control apparatus 300 times out (see the lower center part in FIG. 5). The determination of time-out is performed according to whether or not the command information CI is received from the upper-level control apparatus 300 by a time-out time TO before the time to transmit the next control command CC to the servo control unit 130 (see the lower center part in FIG. 5).

The period from the time-out time TO to the transmission time of the next control command CC can be set to a period longer than zero e.g. 0.1 to 0.2 ms. The transmission time TT of the upper-level control apparatus 300 is set so that the lower-level control apparatus 200 does not time out. That is, the transmission time TT is set so that the command information CI may be received by the lower-level control apparatus 200 by the time-out time TO when the upper-level control apparatus 300 transmits the command information CI to the lower-level control apparatus 200 within the transmission time TT from the time receiving the robot status information RI.

When the time-out occurs, the control command generation unit 220 performs extrapolation of the position command using the previous control commands CC and generates the next control command CC. It is preferable to use the latest control commands CC at a predetermined number of times equal to or more than two as the control commands CC in the past. Further, the control command generation unit 220 checks whether or not the position, the velocity, the acceleration exceed limits with respect to the position command contained in the next control command CC. When the control command CC does not have an abnormality, in the processing P11, the control command generation unit 220 transmits the control command CC via the real-time communication unit 230 to the servo control unit 130 (see the lower right part in FIG. 5).

As described above, when the time-out occurs, the next control command CC is generated by extrapolation of the control commands CC in the past. Thereby, even when the command information CI transmitted from the upper-level control apparatus 300 to the lower-level control apparatus 200 is delayed, the appropriate control command CC may be transmitted to the servo control unit 130.

The command information CI transmitted from the upper-level control apparatus 300 after the time-out occurs is discarded in processing P12 (see the lower center part in FIG. 5). As described above, the unique serial sequence number is assigned to the command information CI. The control command generation unit 220 discards the command information CI, but executes update of the sequence number. Therefore, when receiving the next command information CI, the control command generation unit 220 can determine whether or not the command information CI is the expected command information CI from the sequence number contained in the command information.

Note that, in the example of FIG. 5, when the time-out occurs in the communication, the next control command CC is extrapolated from the control commands CC in the past. However, the next control command CC may be created using another method than the extrapolation. For example, the same control command as the previous control command CC may be employed as the next control command CC. As described above, when failed to receive the command information CI by the predetermined time-out time TO, the lower-level control apparatus 200 may create the next control command CC using the control commands CC in the past without using the command information CI transmitted from the upper-level control apparatus 300 and transmit the command to the servo control unit 130. In this manner, even when the command information CI transmitted from the upper-level control apparatus 300 to the lower-level control apparatus 200 is delayed, the robot 100 may be moved.

Figure 6:
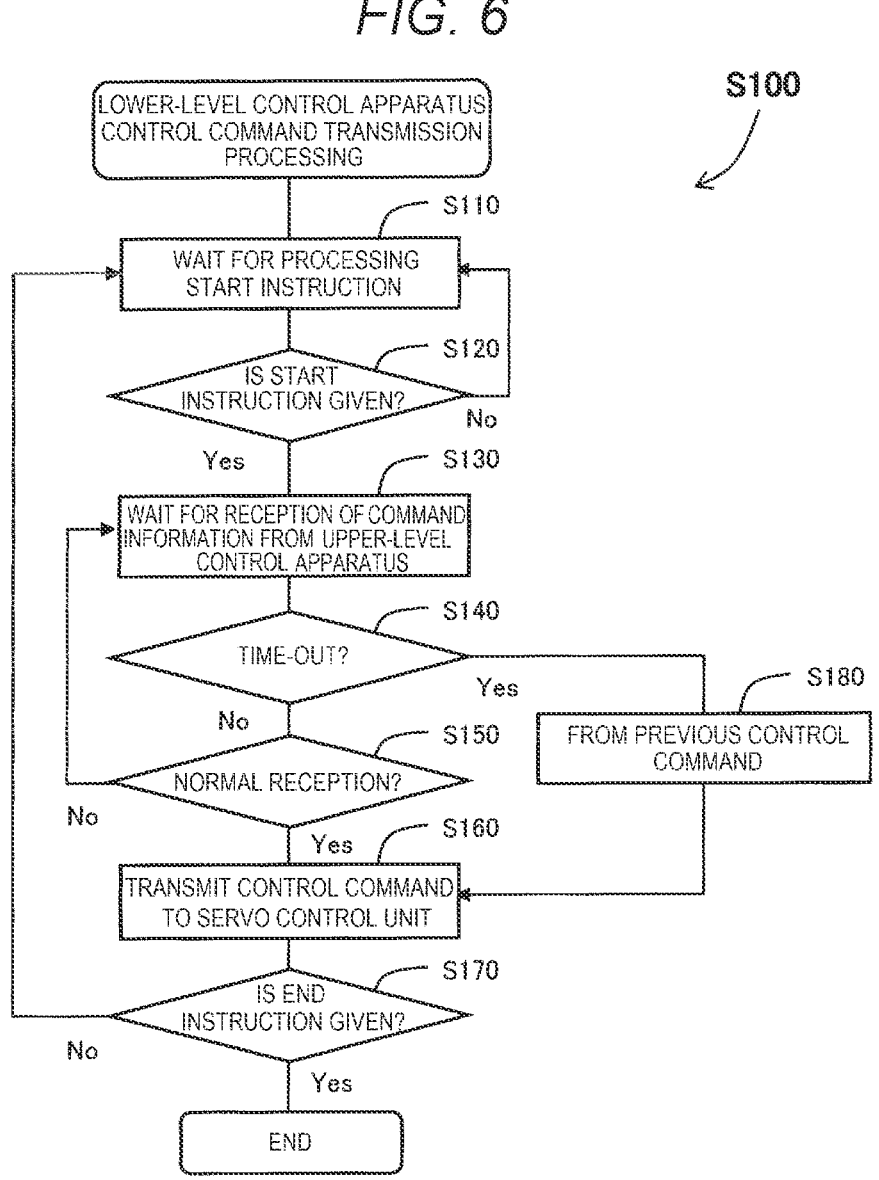
FIG. 6 is a flowchart showing a procedure of transmission processing of a control command by a lower-level control apparatus.

FIG. 6 is a flowchart showing a procedure of transmission processing of the control command CC by the lower-level control apparatus 200. At steps S110, S120, the control command generation unit 220 waits until reception of a processing start instruction from the real-time communication unit 230. When receiving the processing start instruction, at step S130, the control command generation unit 220 waits until reception of the command information CI from the upper-level control apparatus 300.

When the reception of the command information CI does not time out at step S140 and a normality of the command information CI is confirmed at step S150, the process goes to step S160 and the control command generation unit 220 creates the next control command CC from the command information CI and transmits the command to the servo control unit 130.

On the other hand, when the time-out occurs at step S140, the process goes to step S180 and the control command generation unit 220 creates the next control command CC using the control commands CC in the past and transmits the command to the servo control unit 130. The processing at step S180 corresponds to the processing P10, P11 described in FIG. 5.

When the command information CI is not normal at step S150, the command information CI is discarded and retransmission of the command information CI is requested to the upper-level control apparatus 300, and the process returns to step S130.

At step S170, the control command generation unit 220 determines whether or not an end instruction on the processing is received and, when not received, the process returns to step S110 and the processing at step S110 and the subsequent steps is repeated. Note that the end instruction on the processing is transmitted from the upper-level control apparatus 300 to the lower-level control apparatus 200, for example.

Figure 7:
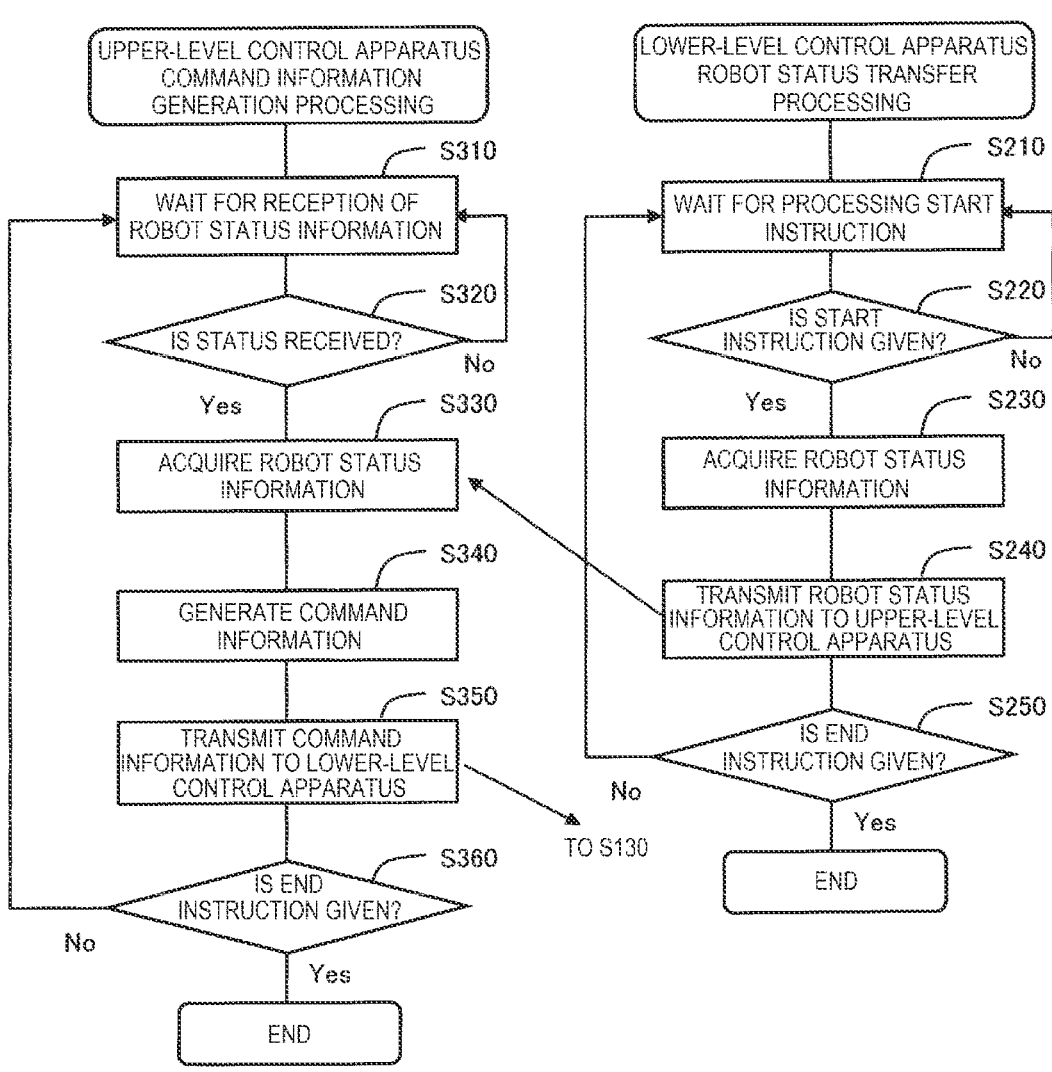
FIG. 7 is a flowchart showing a transmission and reception procedure of robot status information and a transmission procedure of command information between the upper-level control apparatus and the lower-level control apparatus.

FIG. 7 is a flowchart showing a transmission and reception procedure of the robot status information RI and a transmission procedure of the command information CI between the upper-level control apparatus 300 and the lower-level control apparatus 200. Steps S310 to S360 show processing by the upper-level control apparatus 300 and steps S210 to S250 show processing by the lower-level control apparatus 200.

At steps S210, S220, the robot status transfer unit 240 waits until reception of a processing start instruction from the real-time communication unit 230. When receiving the processing start instruction, at step S230, the robot status transfer unit 240 acquires the robot status information RI transmitted from the servo control unit 130 and, at step S240, transmits the information via the non-real-time communication unit 210 to the upper-level control apparatus 300.

At step S250, whether or not the end instruction on the processing is received is determined and, when not received, the process returns to step S210 and the processing at step S210 and the subsequent steps are repeated. Note that the end instruction on the processing is transmitted from the upper-level control apparatus 300 to the lower-level control apparatus 200, for example.

At steps S310, S320, the non-real-time communication unit 320 waits until reception of the robot status information RI from the lower-level control apparatus 200. When the robot status information RI is received, at step S330, the command information generation unit 310 acquires the robot status information RI from the non-real-time communication unit 320 and, at step S340, generates the next command information CI using the robot status information RI as necessary.

At step S350, the command information generation unit 310 transmits the command information CI via the non-real-time communication unit 320 to the lower-level control apparatus 200. In response to the transmission of the command information CI, the processing at step S130 and the subsequent steps shown in FIG. 6 is executed.

At step S360, the command information generation unit 310 determines whether or not an end instruction on the processing is received and, when not received, the process returns to step S310 and the processing at step S310 and the subsequent steps is repeated. Note that the end instruction on the processing is issued when a worker inputs that the work by the robot 100 is finished to the upper-level control apparatus 300, for example, in response to the input.

As described above, in the robot control system 1 of the above described embodiment, the lower-level control apparatus 200 transmits the robot status information RI to the upper-level control apparatus 300 in synchronization with the control period of the robot, and the upper-level control apparatus 300 transmits the command information CI to the lower-level control apparatus 200 within the predetermined transmission time TT shorter than the control period of the robot from the time when receiving the robot status information RI from the lower-level control apparatus 200. According to the robot control system 1, the communication between the upper-level control apparatus 300 and the lower-level control apparatus 200 is performed within the transmission time TT shorter than the control period of the robot, and therefore, the lower-level control apparatus 200 may transmit the control command CC to the servo control unit 130 with respect to each control period, and a robot motion requiring responsiveness may be executed without any trouble.

Further, in related art, the control of the robot 100 is performed mainly by the lower-level control apparatus 200 that may perform the real-time communication with the robot 100. However, in the robot control system 1 of the above described embodiment, the communication between the upper-level control apparatus 300 and the lower-level control apparatus 200 is performed within the predetermined transmission time TT shorter than the control period of the robot. Accordingly, the command information CI is transmitted to the lower-level control apparatus 200, and thereby, the upper-level control apparatus 300 operating with the non-real-time OS may mainly control the robot 100.

The lower-level control apparatus 200 of the embodiment is also referred to as "lower-level control unit". The upper-level control apparatus 300 is also referred to as "upper-level control unit". The communication process with the lower-level control apparatus 200 in the upper-level control apparatus 300 is also referred to as "communication task". The CPU 350 is also referred to as "processor". The operating system OS and the robot control program RP are also referred to as "computer program".

B. Second Embodiment

In the first embodiment, the CPU 350 of the upper-level control apparatus 300 includes the four processor cores 301 to 304. Further, the upper-level control apparatus 300 controls the single robot 100. On the other hand, in the second embodiment, a CPU 350B of an upper-level control apparatus 300B includes six processor cores 301 to 306. Further, the upper-level control apparatus 300B simultaneously controls two robots 100a, 100b. The rest of the robot system of the second embodiment is the same as that of the robot system of the first embodiment.

Figure 8:
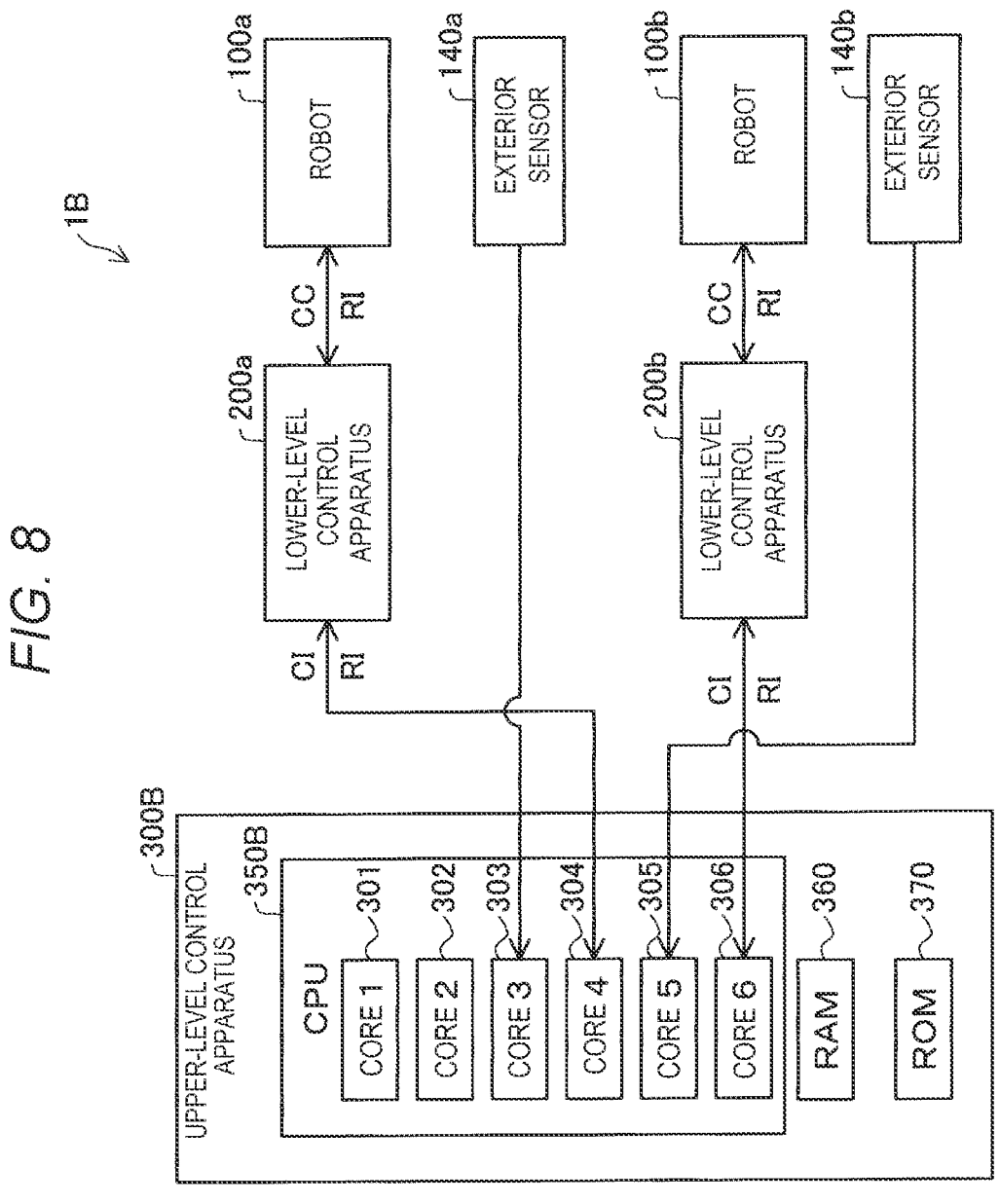
FIG. 8 is a functional block diagram of a robot control system of a second embodiment.

FIG. 8 is a functional block diagram of a robot control system 1B of the second embodiment. The robot control system 1B of the second embodiment includes the robots 100a, 100b, exterior sensors 140a, 140b, end effectors 150a, 150b, lower-level control apparatuses 200a, 200b, and the upper-level control apparatus 300B. To facilitate understanding of the technique, the respective detailed configurations and the end effectors 150a, 150b are not shown in FIG. 8.

The configurations of the robot 100a, the exterior sensor 140a, the end effector 150a, and the lower-level control apparatus 200a are the same as those of the robot 100, the exterior sensor 140, the end effector 150, and the lower-level control apparatus 200 of the first embodiment, respectively. The configurations of the robot 100b, the exterior sensor 140b, the end effector 150b, and the lower-level control apparatus 200b are the same as those of the robot 100, the exterior sensor 140, the end effector 150, and the lower-level control apparatus 200 of the first embodiment, respectively.

The upper-level control apparatus 300B is coupled to the lower-level control apparatuses 200a, 200b. The upper-level control apparatus 300B transmits command information CI for control of the robot 100a to the lower-level control apparatus 200a. The function of the upper-level control apparatus 300B transmitting the command information CI to the lower-level control apparatus 200a is the same as the function of the upper-level control apparatus 300 transmitting the command information CI to the lower-level control apparatus 200 in the first embodiment. The upper-level control apparatus 300B transmits command information CI for control of the robot 100b to the lower-level control apparatus 200b. The function of the upper-level control apparatus 300B transmitting the command information CI to the lower-level control apparatus 200b is the same as the function of the upper-level control apparatus 300 transmitting the command information CI to the lower-level control apparatus 200 in the first embodiment.

In the second embodiment, the functions of the command information generation unit 310 functioning to transmit the command information CI to the lower-level control apparatus 200a and the non-real-time communication unit 320 (see the left part in FIG. 2) are realized by the processor core 304. The function of the sensor value receiving unit 330 executing communication with the exterior sensor 140a is realized by the processor core 303. On the other hand, the functions of the command information generation unit 310 functioning to transmit the command information CI to the lower-level control apparatus 200b and the non-real-time communication unit 320 (see the left part in FIG. 2) are realized by the processor core 306. The function of the sensor value receiving unit 330 executing communication with the exterior sensor 140b is realized by the processor core 305.

In the control of the robots 100a, 100b in the second embodiment, the processor cores 304, 306 are isolated from the other processor cores 301 to 303, 305. As below, processing when the upper-level control apparatus 300 B of the second embodiment performs control of the robots 100a, 100b will be explained.

At step S10 in FIG. 3, isolation processing of isolating the processor cores 304, 306 of the processor cores 301 to 306 from the other processor cores 301 to 303, 305 is executed. Further, at step S10, processing of fixing the operation clocks of the isolated processor cores 304, 306 is executed. The details of the processing are the same as those of the processing at step S10 in the first embodiment.

At step S20 in FIG. 3, assignment processing of assigning the communication process with the lower-level control apparatus 200a of the two lower-level control apparatuses 200a, 200b to the processor core 304 of the isolated two processor cores 304, 306 is executed. Similarly, assignment processing of assigning the communication process with the lower-level control apparatus 200b to the processor core 306 is executed. That is, the assignment processing of the communication process to the processor core is executed with respect to each of the two lower-level control apparatuses 200a, 200b. The details of the processing are the same as those of the processing at step S20 in the first embodiment.

At step S30 in FIG. 3, work by the robots 100a, 100b is executed. The processor core 304 of the upper-level control apparatus 300B executes the process for controlling the robot 100a. The processor core 306 of the upper-level control apparatus 300B executes the process for controlling the robot 100b. More specifically, the upper-level control apparatus 300B controls the processor core 304 to execute the communication process with the lower-level control apparatus 200a, and thereby, transmits the command information CI to the lower-level control apparatus 200a. The upper-level control apparatus 300B controls the processor core 306 to execute the communication process with the lower-level control apparatus 200b, and thereby, transmits the command information CI to the lower-level control apparatus 200b. That is, the processing of controlling the processor core to execute the communication process with the lower-level control unit is executed with respect to each of the two lower-level control apparatuses 200a, 200b. The details of the processing are the same as those of the processing at step S30 in the first embodiment.

At step S40 in FIG. 3, the work by the robots 100a, 100b ends. The processor cores 304, 306 of the upper-level control apparatus 300B end the process for controlling the robots 100a, 100b.

At step S50 in FIG. 3, release processing of releasing isolation of the isolated processor cores 304, 306 is executed. Further, at step S50, processing of setting the operation clocks of the isolated processor cores 304, 306 to be variable is executed. The specific processing at step S50 is the same as the processing at step S50 in the first embodiment.

According to the second embodiment, when the upper-level control apparatus 300B controls the robots 100a, 100b, regarding the respective robots 100a, 100b, it is highly possible that the command information CI may be transmitted from the upper-level control apparatus 300B to the respective lower-level control apparatuses 200a, 200b without a delay for the timing determined by the control periods of the robots 100a, 100b.

C. Other Embodiments

C1. Other Embodiments 1

(1) In the above described first embodiment, the force sensor 142 is attached to the distal end portion of the robot arm 120 (see the center part in FIG. 1). However, the force sensor may be attached to another portion such as a base portion of the robot arm.

(2) In the above described first embodiment, as the exterior sensor, the example of the force sensor 142 is explained (see the lower right part in FIG. 2). However, as the exterior sensor, for example, another sensor such as a proximity sensor that may detect that a distance to another object becomes a certain value or less may be employed. The robot may include a single proximity sensor at the distal end of the robot arm. Or, the robot may include a plurality of proximity sensors in a plurality of portions of the robot arm. In FIG. 2, a proximity sensor 144 is shown by a broken line.

The command information generation unit 310 may create the command information CI to prevent contact between the robot arm 120 and an obstacle by creating the command information CI using the detection value of the proximity sensor. On the other hand, the command information generation unit 310 creates the command information CI using the detection value of the force sensor 142, and thereby, may create the command information CI, for example, to bring the end effector 150 and an object of work into contact, apply a fixed force for a fixed time, and then, separate the end effector 150 from the object of work.

(3) In the above described first embodiment, the tasks executed by the CPU 350 as the processor of the upper-level control apparatus 300 include the task of the command information generation unit 310, the task of the non-real-time communication unit 320, and the task of the work plan creation program JPP (see FIG. 2). However, the tasks executed by the CPU may include other tasks such as a task of three-dimensionally displaying the state of the robot arm and a task of saving progress of work in a file.

(4) In the above described first embodiment, the script containing the "cset shield" command is executed on the Linux, and thereby, the processor core is isolated (see S10 in FIG. 3). Further, the script containing the "cpufreq-set" command is executed, and thereby, the operation clock of the processor core is fixed. However, the technique of the present disclosure may be realized on another OS than Linux.

For example, when the technique of the present disclosure is executed on Windows (registered trademark), the isolation of the processor core may be performed with a "SetProcessAffinityMask" function. Further, the fixation of the operation clock may be performed by setting of [Control Panel]-[Hardware and Sound]-[Power Option]-[Edit Plan Settings].

(5) In the above described first embodiment, the other processes than the processes of the command information generation unit 310 and the non-real-time communication unit 320 are executed by the other processor cores than the processor core 304. However, of the other processes than the processes of the command information generation unit 310 and the non-real-time communication unit 320, the process having a low load may be executed by the isolated processor core. Further, regarding the process having a low load, execution in the isolated processor core and execution in the non-isolated processor core may be switched according to the magnitude of the load of the process.

(6) In the above described first embodiment, the sensor value receiving unit 330 is realized by the non-isolated processor core 303 and executes the non-real-time communication with the exterior sensor 140 (see the upper left part in FIG. 2). However, the sensor value receiving unit may be realized by the isolated processor core and execute the communication with the exterior sensor 140. According to the configuration, the isolated processor core may be controlled to stably execute the communication process with the lower-level control apparatus without being affected by the load of the processing executed by the other processor core.

(7) In the above described first embodiment, at step S10 in FIG. 3, the processor core 304 is isolated. At step S20, the communication process with the lower-level control apparatus 200 is assigned to the processor core 304. At step S30, the processor core 304 executes the communication process with the lower-level control apparatus 200. At step S50, the isolation of the processor core 304 is released.

However, a plurality of processor cores, e.g. the processor cores 304, 306 may perform control of the single robot 100 via the single lower-level control apparatus 200. That is, the isolation step S10 and the release step S50 may be executed on the plurality of processor cores as part of the processor cores. The assignment step S20 may include a step of assigning one or more communication processes with one or more lower-level control units to the isolated plurality of processor cores. The communication step S30 may include a step of transmitting the command information CI to one or more lower-level control units by controlling the isolated plurality of processor cores to execute the one or more communication processes with the one or more lower-level control units.

According to the configuration, when the load of the communication process with the lower-level control apparatus 200 is higher for the respective throughput of the plurality of processor cores 301 to 306 of the upper-level control unit, the following effects are exerted. That is, compared to the system that may execute the isolation processing, the assignment processing, the communication processing, the release processing with respect to only the single processor core 304, a possibility that the transmission of the command information CI is late for the timing determined by the control period of the robot 100 may be reduced.

(8) In the above described second embodiment, the upper-level control apparatus 300B simultaneously controls the two robots 100a, 100b. Further, the single processor core controls the single robot via the single lower-level control apparatus (see FIG. 8). However, the upper-level control unit may simultaneously control three, five, ten, or more robots. Note that it is preferable that the number of processor cores m of the processor of the upper-level control unit is equal to or larger than the number of robots n of the robot control system.

C2. Other Embodiment 2

In the above described embodiments, at step S10, the processing of fixing the operation clock of the isolated processor core is executed (see S10 in FIG. 3). However, the operation clock of the isolated processor core may be set to be variable according to the load.

C3. Other Embodiment 3

In the above described other embodiment 1, the isolation step S10 and the release step S50 are executed on the plurality of processor cores as part of the processor cores. The assignment step S20 includes assigning one or more communication processes with one or more lower-level control units to the isolated plurality of processor cores. The communication step S30 includes controlling the isolated plurality of processor cores to execute the one or more communication processes with the one or more lower-level control units. However, as shown in the first embodiment, the isolation step S10 and the release step S50 may be executed on the single processor core 304. The assignment step S20 may include assigning the single communication process with the single lower-level control unit 200 to the isolated single processor core 304. The communication step S30 may include controlling the isolated single processor core 304 to execute the single communication process with the single lower-level control unit 200.

C4. Other Embodiment 4

In the above described second embodiment, the upper-level control apparatus 300B simultaneously controls the two robots 100a, 100b. Further, the single processor core controls the single robot via the single lower-level control apparatus (see FIG. 8). However, a plurality of processor cores may control the single robot via the single lower-level control unit. Or, the single processor core may control a plurality of robots via a plurality of lower-level control units. That is, the number of processor cores may be larger or smaller than the number of robots.

D. Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the problems of the present disclosure or achieving part or all of the effects of the present disclosure. The technical features not described as essential features in this specification can be appropriately deleted.

(1) According to a first aspect of the present disclosure, a method, in a robot system including one or more robots, one or more lower-level control units respectively coupled to the one or more robots and respectively controlling one of the one or more robots, and an upper-level control unit coupled to the one or more lower-level control units and transmitting command information for control of the one or more robots to the one or more lower-level control units, of controlling the one or more robots executed by the upper-level control unit is provided. The upper-level control unit includes a processor having a plurality of processor cores. The method includes an isolation step of isolating part of the processor cores of the plurality of processor cores from the other processor cores of the plurality of processor cores, an assignment step of assigning one or more communication tasks with the one or more lower-level control units to the isolated part of the processor cores, a communication step of transmitting the command information to the one or more lower-level control units by controlling the isolated part of the processor cores to execute the one or more communication tasks with the one or more lower-level control units, and a release step of releasing the isolation of the isolated part of the processor cores.

In the aspect, the part of the processor core may be controlled to execute the communication task with the lower-level control unit without being affected by the load of the processing executed by the other processor core. Accordingly, even when the upper-level control unit not introducing the real-time operating system is used, it is highly possible that the command information may be transmitted to the lower-level control unit without a delay for the timing determined by the control period of the robot in the lower-level control unit.

Further, after the control of the robot ends, the isolation of the part of the processor cores to which the communication task is assigned is released, and then, the throughput of the upper-level control unit when other processing than the control of robot is executed may be increased.

(2) The method may include fixing an operation clock of the isolated part of the processor cores.

In the processor core having the variable operation clock, the operation clock becomes lower when the load is lower. Then, when it is necessary to execute some processing, the operation clock is increased. In the processor core, transition from the lower operation clock to the higher operation clock takes time and, when the communication task with the lower-level control unit is executed, the execution may be late for the necessary timing. However, in the above described configuration, the operation clock of the isolated part of the processor cores is fixed, and thereby, the delay may be prevented.

(3) In the method, the isolation step and the release step may be executed on the plurality of processor cores as the part of the processor cores, the assignment step may include assigning the one or more communication tasks with the one or more lower-level control units to the isolated plurality of processor cores, and the communication step may include transmitting the command information to the one or more lower-level control units by controlling the isolated plurality of processor cores to execute the one or more communication tasks with the one or more lower-level control units.

According to the configuration, when the load of the communication task with the lower-level control unit is higher for the respective throughput of the plurality of processor cores of the upper-level control unit, the following effects are exerted. That is, compared to the system that may execute the isolation processing, the assignment processing, the communication processing, the release processing with respect to only the single processor core, a possibility that the transmission of the command information is late for the timing determined by the control period of the robot may be reduced.

(4) In the method, the one or more robots may be n number of robots, n being an integer of two or more, the one or more lower-level control units are n number of lower-level control units, the isolation step may include isolating m number of processor cores, m being an integer of n or more, as the part of the processor cores, the assignment step may include executing processing of assigning the single communication task with the single lower-level control unit of the n number of lower-level control units to one or more processor cores of the isolated m number of processor cores with respect to each of the n number of lower-level control units, and the communication step may include executing processing of controlling the one or more processor cores to which the single communication task with the single lower-level control unit is assigned to execute the single communication task with the single lower-level control unit with respect to each of the n number of lower-level control units.

In the configuration, it is highly possible that the command information may be transmitted from the upper-level control unit to the lower-level control unit without a delay for the timing determined by the control period of the robot with respect to each of the plurality of robots.

(5) According to a second aspect of the present disclosure, a robot system is provided. The robot system includes one or more robots, one or more lower-level control units respectively coupled to the one or more robots and respectively controlling one of the one or more robots, and an upper-level control unit coupled to the one or more lower-level control units and transmitting command information for control of the one or more robots to the one or more lower-level control units. The upper-level control unit includes a processor having a plurality of processor cores. The upper-level control unit is configured to execute isolation processing of isolating part of the processor cores of the plurality of processor cores from the other processor cores of the plurality of processor cores, assignment processing of assigning one or more communication tasks with the one or more lower-level control units to the isolated part of the processor cores, communication processing of transmitting the command information to the one or more lower-level control units by controlling the isolated part of the processor cores to execute the one or more communication tasks with the one or more lower-level control units, and release processing of releasing the isolation of the isolated part of the processor cores.

(6) According to a third aspect of the present disclosure, a robot system is provided. The robot system includes one or more robots, one or more lower-level control units respectively coupled to the one or more robots and respectively controlling one of the one or more robots, and an upper-level control unit coupled to the one or more lower-level control units and transmitting command information for control of the one or more robots to the one or more lower-level control units. The upper-level control unit includes a processor having a plurality of processor cores, a multitask operating system, a plurality of tasks executed on the multitask operating system by one or more processor cores of the plurality of processor cores and including one or more communication tasks with the one or more lower-level control units, an isolation script describing for isolating part of the processor cores of the plurality of processor cores from the other processor cores of the plurality of processor cores, and a release script describing for releasing the isolation of the isolated part of the processor cores. The upper-level control unit is configured to assign the one or more communication tasks to the isolated part of the processor cores.

(7) According to a fourth aspect of the present disclosure, a non-transitory computer-readable storage medium storing a computer program, in a robot system including one Or more robots, one or more lower-level control units respectively coupled to the one or more robots and respectively controlling one of the one or more robots, and an upper-level control unit coupled to the one or more lower-level control units and transmitting command information for control of the one or more robots to the one or more lower-level control units, the computer program executed by the upper-level control unit for controlling the one or more robots is provided. The upper-level control unit includes a processor having a plurality of processor cores, a multitask operating system, and a plurality of tasks executed on the multitask operating system by one or more processor cores of the plurality of processor cores and including one or more communication tasks with the one or more lower-level control units. The computer program includes an isolation script describing for isolating part of the processor cores of the plurality of processor cores from the other processor cores of the plurality of processor cores, and a release script describing for releasing the isolation of the isolated part of the processor cores, wherein the isolation script describes for assigning the one or more communication tasks to the isolated part of the processor cores.

The present disclosure can be realized in various other aspects than those described as above. For example, the present disclosure can be realized in aspects of a robot system including a robot and a robot control apparatus, a computer program for realization of the functions of the robot control apparatus, and a non-transitory storage medium recording the computer program, etc.

What is claimed is:

1. A method, in a robot system including one or more robots, one or more lower-level controllers respectively coupled to the one or more robots and respectively controlling one of the one or more robots, and an upper-level controller coupled to the one or more lower-level controllers and transmitting command information for control of the one or more robots to the one or more lower-level controllers, of controlling the one or more robots executed by the upper-level controller, the upper-level controller including a processor having a plurality of processor cores, the one or more robots have a first robot, and the one or more lower-level controllers have a first lower-level controller, the method comprising:

receiving, by the first lower-level controller, a robot sensor signal from the first robot via a real-time communication interface;

receiving, by the upper-level controller, the robot sensor signal from the first lower-level controller via a non-real-time communication interface;

isolating part of the processor cores of the plurality of processor cores from the other processor cores of the plurality of processor cores;

assigning one or more communication tasks with the first lower-level controller to the isolated part of the processor cores;

transmitting, by the upper-level controller, the command information to the first lower-level controller via the non-real-time communication interface in synchronization with a robot control cycle by controlling the isolated part of the processor cores to execute the one or more communication tasks with the first lower-level controller;

transmitting, by the first lower-level controller, the command information to the first robot via the real-time communication interface;

causing the first robot to perform an operation based on the command information by the first lower-level controller; and releasing the isolation of the isolated part of the processor cores after the first robot has completed the operation, wherein the upper-level controller is configured to transmit the command information to the first lower-level controller within a first period of time from receiving the robot sensor signal, and the first period of time is shorter than one unit cycle of the robot control cycle.

2. The method according to claim 1, further comprising fixing an operation clock of the isolated part of the processor cores.

3. The method according to claim 1, wherein the isolating of the processor cores and the releasing of the isolation are executed on the plurality of processor cores as the part of the processor cores, the one or more communication tasks with the first lower-level controller is assigned to the isolated plurality of processor cores, and the command information is transmitted to the first lower-level controller by controlling the isolated plurality of processor cores to execute the one or more communication tasks with the first lower-level controller.

4. The method according to claim 1, wherein the one or more robots are n number of robots, n being an integer of two or more, the one or more lower-level controllers are n number of lower-level controllers, m number of processor cores are isolated, m being an integer of n or more, as the part of the processor cores, the assigning includes executing processing of assigning the single communication task with the single lower-level controller of the n number of lower-level controllers to one or more processor cores of the isolated m number of processor cores with respect to each of the n number of lower-level controllers, and the transmitting includes executing processing of controlling the one or more processor cores to which the single communication task with the single lower-level controller is assigned to execute the single communication task with the single lower-level controller with respect to each of the n number of lower-level controllers.

5. The method according claim 1, further comprising:

receiving, by the upper-level controller, an external sensor signal from an external sensor, the external sensor being separately provided from the first robot.

6. A robot system comprising:

one or more robots;

one or more lower-level controllers respectively coupled to the one or more robots and respectively controlling one of the one or more robots; and an upper-level controller coupled to the one or more lower-level controllers and transmitting command information for control of the one or more robots to the one or more lower-level controllers, wherein the upper-level controller including a processor having a plurality of processor cores, the one or more robots have a first robot, and the one or more lower-level controllers have a first lower-level controller, and the upper-level controller is configured to:

cause the first lower-level controller to receive a robot sensor signal from the first robot via a real-time communication interface;

receive the robot sensor signal from the first lower-level controller via a non-real-time communication interface;

isolate part of the processor cores of the plurality of processor cores from the other processor cores of the plurality of processor cores;

assign one or more communication tasks with the first lower-level controller to the isolated part of the processor cores;

transmit the command information to the first lower-level controller via the non-real-time communication interface in synchronization with a robot control cycle by controlling the isolated part of the processor cores to execute the one or more communication tasks with the first lower-level controller;

cause the first lower-level controller to transmit the command information to the first robot via the real-time communication interface and to cause the first robot to perform an operation based on the command information; and release the isolation of the isolated part of the processor cores after the first robot has completed the operation, wherein the upper-level controller is configured to transmit the command information to the first lower-level controller within a first period of time from receiving the robot sensor signal, and the first period of time is shorter than one unit cycle of the robot control cycle.

7. A robot system comprising:

one or more robots having a first robot;

one or more lower-level controllers respectively coupled to the one or more robots and respectively controlling one of the one or more robots, the one or more lower-level controllers having a first lower-level controller; and an upper-level controller coupled to the one or more lower-level controllers and transmitting command information for control of the one or more robots to the one or more lower-level controllers, wherein the upper-level controller is configured to:

cause the first lower-level controller to receive a robot sensor signal from the first robot via a real-time communication interface; and receive the robot sensor signal from the first lower-level controller via a non-real-time communication interface, the upper-level controller includes:

a processor having a plurality of processor cores;

a multitask operating system;

a plurality of tasks executed on the multitask operating system by one or more processor cores of the plurality of processor cores and including one or more communication tasks with the one or more lower-level controllers, an isolation script describing for isolating part of the processor cores of the plurality of processor cores from the other processor cores of the plurality of processor cores, an assignment script describing for assigning one or more communication tasks with the first lower-level controller to the isolated part of the processor cores, a communication processing script describing for transmitting the command information to the first lower-level controller via the non-real-time communication interface in synchronization with a robot control cycle by controlling the isolated part of the processor cores to execute the one or more communication tasks with the first lower-level controller such that the command information is transmitted, by the first lower-level controller, to the first robot via the real-time communication interface to cause the first robot to perform an operation based on the command information, and a release script describing for releasing the isolation of the isolated part of the processor cores after the first robot has completed the operation, wherein the upper-level controller is configured to transmit the command information to the first lower-level controller within a first period of time from receiving the robot sensor signal, and the first period of time is shorter than one unit cycle of the robot control cycle.

8. A non-transitory computer-readable storage medium storing a computer program, in a robot system including one or more robots having a first robot, one or more lower-level controllers respectively coupled to the one or more robots and respectively controlling one of the one or more robots, the one or more lower-level controllers having a first lower-level controller, and an upper-level controller coupled to the one or more lower-level controllers and transmitting command information for control of the one or more robots to the one or more lower-level controllers, the computer program executed by the upper-level controller for controlling the one or more robots, the upper-level controller is configured to:

cause the first lower-level controller to receive a robot sensor signal from the first robot via a real-time communication interface; and receive the robot sensor signal from the first lower-level controller via a non-real-time communication interface, the upper-level control unit including:

a processor having a plurality of processor cores;

a multitask operating system; and a plurality of tasks executed on the multitask operating system by one or more processor cores of the plurality of processor cores and including one or more communication tasks with the one or more lower-level controllers, the computer program comprising:

an isolation script describing for isolating part of the processor cores of the plurality of processor cores from the other processor cores of the plurality of processor cores;

an assignment script describing for assigning one or more communication tasks with the first lower-level controller to the isolated part of the processor cores, a communication processing script describing for transmitting the command information to the first lower-level controller via the non-real-time communication interface in synchronization with a robot control cycle by controlling the isolated part of the processor cores to execute the one or more communication tasks with the first lower-level controller such that the command information is transmitted, by the first lower-level controller, to the first robot via the real-time communication interface to cause the first robot to perform an operation based on the command information, and a release script describing for releasing the isolation of the isolated part of the processor cores after the first robot has completed the operation, wherein the upper-level controller is configured to transmit the command information to the first lower-level controller within a first period of time from receiving the robot sensor signal, and the first period of time is shorter than one unit cycle of the robot control cycle.

* * * * *